UNITED STATES PATENT OFFICE.

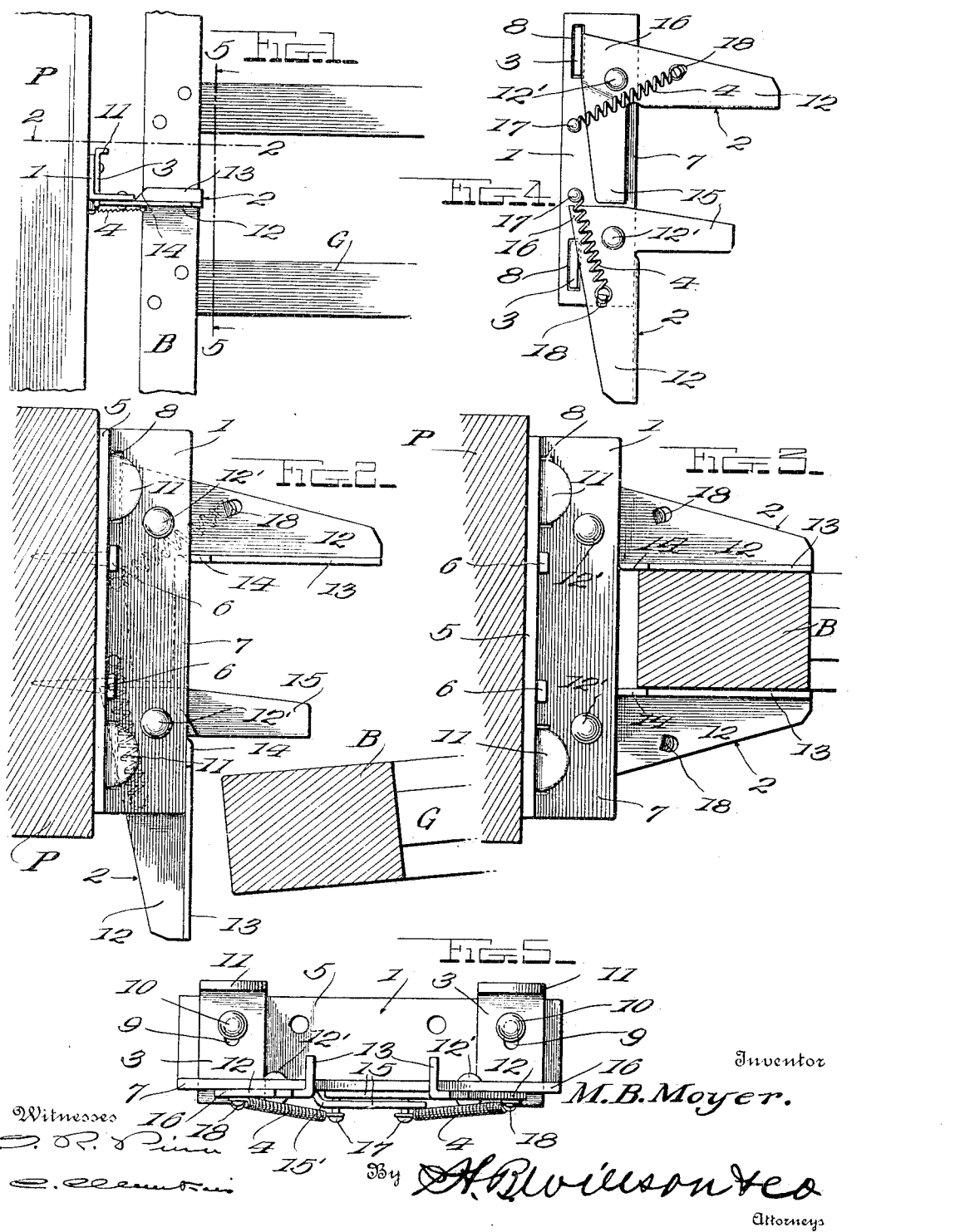

MALCOLM B. MOYER, OF MONTEVIDEO, MINNESOTA, ASSIGNOR TO MOYER MANUFACTURING COMPANY, OF MONTEVIDEO, MINNESOTA.

GATE-LATCH.

1,117,949. Specification of Letters Patent. Patented Nov. 17, 1914.

Application filed March 19, 1914. Serial No. 825,845.

*To all whom it may concern:*

Be it known that I, MALCOLM B. MOYER, a citizen of the United States, residing at Montevideo, in the county of Chippewa and State of Minnesota, have invented certain new and useful Improvements in Gate-Latches; and I do declare the following to be a full, clear, and exact description of the invention, such as will enable others skilled in the art to which it appertains to make and use the same.

This invention relates to improvements in gate latches and the primary object of the same is to provide a simply constructed latch which will be automatically closed and locked by the closing of a gate in connection with which it is employed. In carrying out this object, I provide a pair of L-shaped gate stops having portions to be struck by the gate, portions to contact with said gate and retain it in closed position and latch bolts for locking said gate in closed position.

A secondary object of the invention lies in providing said gate stops with portions which are adapted to underlie said latch bolts and thus hold them in inoperative position when said stops are swung outwardly, said portions being adapted to release and abut said latch bolts when said stops are closed.

Still another object is to provide means for assisting the closing of the gate stops, said means also assisting in opening the same when the latch bolts are retracted.

With the above objects in view, the invention resides in certain novel features of construction and combination herein described and claimed and shown in the drawings wherein:

Figure 1 is a side elevation showing the application of my invention; Fig. 2 is a horizontal section on the line 2—2 of Fig. 1 with the gate swung partially open; Fig. 3 is a similar view with the gate closed; Fig. 4 is a bottom plan view with one of the gate stops swung open; and Fig. 5 is a vertical section on the line 5—5 of Fig. 1 showing more clearly the construction of the gate stops, the gate being omitted.

In the accompanying drawings I have shown my invention as comprising in general an attaching bracket 1, a pair of gate stops 2, a pair of latch bolts 3 for retaining said stops in closed position, and springs 4 for assisting in closing or opening said gate stops when the latch bolts are retracted.

The bracket 1 is here shown in the form of a rather short strip of angle iron having its upright flange 5 provided with a pair of openings through which fastening bolts or screws 6 pass to secure the same to the gate post P. The horizontal flange 7 of the bracket 1 is provided near its opposite ends and at its juncture with the upright flange 5 with slots 8 through which the bolts 3 pass, said bolts being preferably in the form of metal plates passing loosely through the slots 8 and depending a suitable distance beneath the horizontal flange 7, while their upright portions are slotted as at 9 for the reception of headed studs 10 which project from the upright flange 5 of the base 1. By this mounting of the bolts 3 it will be seen that they are allowed a limited amount of vertical movement and that they are guided in said movement and prevented from disengaging the slots 8. The plates forming the bolts 3 preferably have their upper ends bent laterally as at 11 to provide means for retracting said bolts.

The stops 2 are of substantially L-shaped formation and comprise arms 12 which are pivoted to and project laterally from the horizontal flange 7 when the gate G is in closed position and contact with the opposite sides of its forward bar B as clearly shown in Fig. 3. Each arm 12 is provided with an integral flange 13 which is preferably struck up from its inner edge, the inner end 14 of said flange contacting with the outer edge of said horizontal flange when the parts stand in the position shown in said figure. Each arm 12 is provided with a trip finger 15 which projects inwardly therefrom when the gate is in closed position, one of said fingers being offset as at 15' so that said fingers lie in overlapping engagement beneath the horizontal flange 7. When in this position the depending ends of the bolts 3 are adapted to lie in the paths of laterally extending noses 16 which now extend outwardly from the pivots 12' and are here shown as formed integrally with the outer edges of the arms 12. By this arrangement of parts, it will be seen that the arms 12 are prevented from swinging outwardly and that the gate is therefore locked in closed position.

When it is desired to open the gate, one of the bolts 3 is raised and the gate swung upon its hinges which movement will cause the arm 12 which has been released to swing outwardly around its pivot 12' thereby releasing the gate and positioning its finger 15 in substantially right angular relation to the bracket 1 and in position to be struck by the gate when the same is closed. When either of the arms 12 is swung outwardly for the purpose of releasing the gate, one of the noses 16 will underlie the lower end of one of the bolts 3 and will thereby support said bolt as long as the arm is swung outwardly. When however, the gate is closed, its forward bar B will contact with the projected finger 15 and will move the same inwardly thus bringing the open arm 12 into contact with one of the sides of said bar and also releasing the bolt 3 and allowing it to drop and again abut the nose 16 whereby the gate is again locked in closed position.

For the purpose of assisting in moving the arms 12 outwardly or inwardly, I provide the springs 4 which are here shown in the form of resilient coils having their opposite ends connected respectively to studs 17, depending from the rear edge of the horizontal flange 7 and to lugs 18 which are struck downwardly from the arms 12. When said arms 12 are in closed position (see Fig. 4) the springs 4 will extend across the angles of said arms inside their pivots 12'. Thus it will be seen that when said arms are swung outwardly the tension of said springs will resist until the pivots 12', the studs 17 and the lugs 18 stand in alinement whereupon a slight movement, in either direction, of the arms 12 will allow the tension of said springs to pull upon the lugs 18 and therefore continue the movement of the arms 12 in the direction in which they have been started. When the gate is swung open, and one of the arms 12 consequently stands in alinement with the bracket 1, the tension of said spring 4 will retain the inner side of its flange 13 in contact with the outer edge of the horizontal flange 7 of said bracket. Thus it will be seen that the flanges 13 prevent movement of the arms 12 in either direction. This is a very important feature of the invention since the arms 12 and their trip fingers 15 are always held in correct position whether swung inwardly or outwardly. It is not necessary however, that the flanges 13 be employed for limiting the outward movement of the arms 12, since independent stops might well be employed to equal advantage.

From the foregoing description taken in connection with the accompanying drawings, the construction and operation of the invention will be readily understood without requiring a more extended explanation.

Various changes in form, proportion and minor details may be resorted to without departing from the spirit of the invention as claimed.

Having thus described my invention, what I desire to secure by Letters-Patent is:—

1. A gate latch comprising a bracket for attachment to a gate post and having a slot, a gravity latch slidable therethrough and a gate stop in the form of a bell crank lever pivoted beneath said bracket and having one of its arms adapted to be struck by a closing gate, said gate stop having a portion adapted to underlie and support said latch bolt when the gate is open and to release and abut said latch bolt when the gate is closed and thereby lock the other arm of said bell crank in contact with said gate.

2. A gate latch comprising a bracket for attachment to a gate post, a gate stop in the form of a horizontal arm pivoted to said bracket to swing in a horizontal plane, a stop flange rising from one edge of said arm, a trip finger projecting laterally from said arm and adapted to be struck by a closing gate, a gravity latch bolt carried by said bracket, a lateral projection on said arm adapted to underlie and support said latch bolt when said arm is swung to longitudinal alinement with said bracket and to release and abut said bolt when said arm is swung to right angular relation thereto and a spring for causing said stop flange to contact with said bracket when said arm is swung in either direction.

3. A gate latch comprising an angle iron bracket for attachment to a gate post and having slots through its horizontal flange, a pair of gate stops in the form of horizontally swinging arms pivoted beneath said flange, trip fingers projecting inwardly from said arms and lying in overlapping engagement beneath said flange when said arms are disposed at right angles thereto, gravity latch bolts slidable through the slots in said flange, lateral projections on said arms and adapted to underlie and support said latch bolts when said arms stand in alinement with said flange and to release and abut said bolts when said arms stand at right angles thereto, upright stop flanges rising from the facing edges of said arms and springs for causing said stop flanges to contact with said horizontal flange when said arms are swung in either direction.

4. A gate latch comprising an attaching member, a gravity latch mounted thereon, a bell crank gate stop fulcrumed to move in the path of said latch, and means on one arm of said stop for engaging said attaching member for limiting the movement of said stop in either direction.

5. A gate latch comprising an attaching member, a gravity latch mounted thereon, a bell crank gate stop fulcrumed to move in the path of said latch, a flange on one arm of said stop positioned for longitudinal engagement with said attaching member for limiting the movement of the stop in one direction and for transverse engagement with said attaching member for limiting the movement of the stop in the other direction.

6. A gate latch comprising an attaching member, a gravity latch mounted thereon, a gate engaging member pivoted to swing in a horizontal plane in the path of said latch, and a stop positioned on said gate engaging member to contact with said attaching member when said gate engaging member is swung into open or closed position.

7. A gate latch comprising an attaching member, a gravity latch mounted thereon, a gate engaging member pivoted to swing in a horizontal plane in the path of said latch, and a stop positioned on said gate engaging member to contact with said attaching member when said gate engaging member is swung into open or closed position, and means for yieldably holding said gate engaging member in either open or closed position.

8. A gate latch comprising an attaching member, a gravity latch mounted thereon, a bell crank gate engaging member pivoted on said attaching member to swing in a horizontal plane, a stop flange rising from one edge of one arm of said bell crank, a lateral projection on said bell crank adapted to underlie and support said latch when the arm of said bell crank carrying said stop flange is swung to longitudinal alinement with said attaching member, said projection moving out of the path of said latch when said arm is swung to right angular relation to said attaching member, and resilient means for holding said stop flange in contact with said attaching member when said bell crank is swung in either direction.

9. A gate latch comprising an attaching member, gravity latches mounted thereon, bell crank gate engaging members fulcrumed on said attaching member in spaced relation to swing in a horizontal plane and having means supporting said latches when swung into open position, means for limiting the swinging movement of said bell cranks in opposite directions, one arm of one bell crank being offset and adapted to overlap an arm on the other bell crank when said bell cranks are swung into closed position.

In testimony whereof I have hereunto set my hand in presence of two subscribing witnesses.

MALCOLM B. MOYER.

Witnesses:
OLGA E. JOHNSON,
OPHY LOVE.

Copies of this patent may be obtained for five cents each, by addressing the "Commissioner of Patents, Washington, D. C."